Patented Apr. 8, 1941

2,237,772

UNITED STATES PATENT OFFICE 2,237,772

MANUFACTURE OF AZO PIGMENTS

Harry James Twitchett, Manchester, England, assignor to Imperial Chemical Industries Limited, a corporation of Great Britain No Drawing. Application October 21, 1940, Serial No. 362,155. In Great Britain October 24, 1939

6 Claims. (Cl. 260—197)

This invention relates to a process for manufacturing new azo pigments.

According to the present invention new azo pigments are made by coupling diazotised 3-nitro-4-aminotoluene with β-naphthol in alkaline medium and under such conditions that the coupling product of diazotised 2-chloro-4-nitroaniline and β-naphthol is present in the coupling medium, in proportions as defined below, either during the said coupling or immediately thereafter.

That is to say that the invention may be carried out either by adding the coupling product of diazotised 2-chloro-4-nitroaniline and β-naphthol to, or causing it to be formed in, the coupling medium, at once or by stages, before, during or immediately after coupling, or by employing variations of such methods in accordance with the above statement. For example, the presence of the coupling product of diazotised 2-chloro-4-nitroaniline in the coupling medium may be brought about by causing a mixture of diazotised 3-nitro-4-aminotoluene and diazotised 2-chloro-4-nitroaniline to couple with β-naphthol.

By working according to the present invention pigments are produced which are of a yellower shade of scarlet and of considerably greater tinctorial strength than the pigment made from diazotised 3-nitro-4-aminotoluene by itself and β-naphthol. These effects are new and could not be foreseen and they are not obtainable by mechanically mixing in the same proportions the two azo compounds made separately.

Already when the molecular proportion of 2-chloro-4-nitroaniline employed constitutes only 5% of the total amount of the two amines used, a decided increase in strength is observed. By increasing the proportion of 2-chloro-4-nitroaniline, as much as 24-30% greater strength can be attained. A molecular proportion of 2-chloro-4-nitroaniline of 15% is particularly effective. A larger molecular proportion of 2-chloro-4-nitroaniline than 40% is undesirable owing to the marked change in shade together with a tendency to bleed in oil, thereby occasioned. Accordingly the molecular proportions of 2-chloro-4-nitroaniline to be used in the present invention are defined as being from 5% to 40% of the total amount of the two amines employed.

This invention is illustrated, but not limited, by the following examples in which the parts are by weight.

Example 1

132 parts of 3-nitro-4-aminotoluene are stirred in 2000 parts of water and 87 parts of hydrochloric acid (calculated as 100%). The mixture is cooled with ice to 3° C. and diazotised in the usual manner with 58.7 parts of sodium nitrite.

27.5 parts of 2-chloro-4-nitroaniline are stirred in 250 parts of water and 15.3 parts of hydrochloric acid (calculated as 100%) at 15° C. The mixture is diazotised in the usual manner with 10.4 parts of sodium nitrite.

The two diazo solutions are filtered and mixed and the mixture added slowly to a solution of 150 parts of β-naphthol in 6000 parts of water at 5° C. containing 42 parts of sodium hydroxide and 120 parts of sodium carbonate. After addition of all the diazo solution stirring is continued for 15 minutes. The precipitate is then filtered off, washed until the filtrate does not change the colour of red litmus, and dried. There is thus obtained a scarlet pigment of excellent tinctorial strength and good fastness properties.

Example 2

A solution of diazotised 3-nitro-4-aminotoluene prepared as described in Example 1 is added slowly to a solution of β-naphthol, sodium hydroxide and sodium carbonate prepared as described in Example 1. Immediately after the addition of all the diazotised 3-nitro-4-aminotoluene, a solution of diazotised 2-chloro-4-nitroaniline prepared as described in Example 1 is slowly added. The resulting precipitate is then stirred for 15 minutes, filtered off, washed until the filtrate does not change the colour of red litmus, and dried. A scarlet pigment of high tinctorial strength and good fastness properties is obtained.

Example 3

A solution of diazotised 2-chloro-4-nitroaniline prepared as described in Example 1 is added slowly to a solution of β-naphthol, sodium hydroxide and sodium carbonate prepared as described in Example 1. As soon as addition is complete a solution of diazotised 3-nitro-4-toluidine prepared as described in Example 1 is slowly added. The resulting precipitate is stirred for 15 minutes, filtered off, washed until the filtrate does not change the colour of red litmus, and dried. The product is a scarlet pigment having similar properties to the product of Example 1.

Example 4

Solutions of diazotised 3-nitro-4-aminotoluene and diazotised 2-chloro-4-nitroaniline prepared as described in Example 1 are added separately and simultaneously to 85% and 15% respectively of a solution of β-naphthol, sodium hydroxide and sodium carbonate prepared as described in Example 1. As soon as the additions are complete, the resulting suspensions are mixed and stirred for one hour. The combined precipitate is then filtered off, washed and dried as in Example 1. The product is a scarlet pigment having similar properties to the product of Example 1.

*Example 5*

132 parts of 3-nitro-4-aminotoluene and 27.5 parts of 2-chloro-4-nitroaniline are mixed and stirred together with 2250 parts of water and 102.3 parts of hydrochloric acid (calculated as 100%). The mixture is cooled with ice to 3° C. and diazotised in the usual manner with 69.1 parts of sodium nitrite.

The mixed diazo solution is filtered and added slowly to a solution of 150 parts of β-naphthol in 6000 parts of water at 5° C. containing 42 parts of sodium hydroxide and 120 parts of sodium carbonate. After addition of all the diazo solution stirring is continued for 15 minutes. The precipitate is then filtered off, washed until the filtrate does not change the colour of red litmus, and dried. The product is a scarlet pigment having similar properties to the product of Example 1.

I claim:

1. A colored insoluble mixed azo composition containing the product of coupling diazotized 2-chloro-4-nitroaniline and diazotized 3-nitro-4-aminotoluene with beta naphthol, wherein the residue of 2-chloro-4-nitroaniline in the composition comprises 5% to 40% of the total amine residue and the remainder of the amine residue consists of the residue of 3-nitro-4-amino-toluene, said composition being a yellower shade of scarlet and having greater tinctorial strength than the pigment made by coupling diazotized 3-nitro-4-aminotoluene with beta naphthol and having less tendency to bleed in oil than a pigment wherein the residue of 2-chloro-4-nitroaniline coupled with beta naphthol is in excess of 40% of the total amine residue.

2. A colored insoluble mixed azo composition containing the product of coupling diazotized 2-chloro-4-nitroaniline and diazotized 3-nitro-4-aminotoluene with beta naphthol, wherein the residue of 2-chloro-4-nitroaniline in the composition comprises about 15% of the total amine residue and the remainder of the amine residue consists of the residue of 3-nitro-4-amino-toluene, said composition being a yellower shade of scarlet and having greater tinctorial strength than the pigment made by coupling diazotized 3-nitro-4-aminotoluene with beta naphthol and having less tendency to bleed in oil than a pigment wherein the residue of 2-chloro-4-nitroaniline coupled with beta naphthol is in excess of 40% of the total amine residue.

3. Process for making a new azo pigment which comprises adding diazotized 3-nitro-4-aminotoluene and 2-chloro-4-nitroaniline in acid medium to an alkaline water solution containing sufficient beta naphthol to couple with said diazotized amines, and stirring until a product of coupling is formed, the proportion of acid being insufficient to acidify said alkaline solution of beta naphthol and the proportion of 2-chloro-4-nitroaniline employed for diazotization being from 5% to 40% of the total amine.

4. The process in accordance with claim 3 in which the solution of diazotized 3-nitro-4-aminotoluene and the solution of 2-chloro-4-nitrotoluene are added simultaneously to the beta naphthol solution.

5. The process in accordance with claim 3 in which first one and then the other solution of diazotized amine is added to the beta naphthol solution.

6. Process for making a new azo pigment which comprises adding diazotized 3-nitro-4-aminotoluene and 2-chloro-4-nitroaniline in acid medium to an alkaline water solution containing sufficient beta naphthol to couple with said diazotized amines, and stirring until a product of coupling is formed, the proportion of acid being insufficient to acidify said alkaline solution of beta naphthol and the proportion of 2-chloro-4-nitroaniline employed for diazotization being about 15% of the total amine.

HARRY JAMES TWITCHETT.